Figure 1:
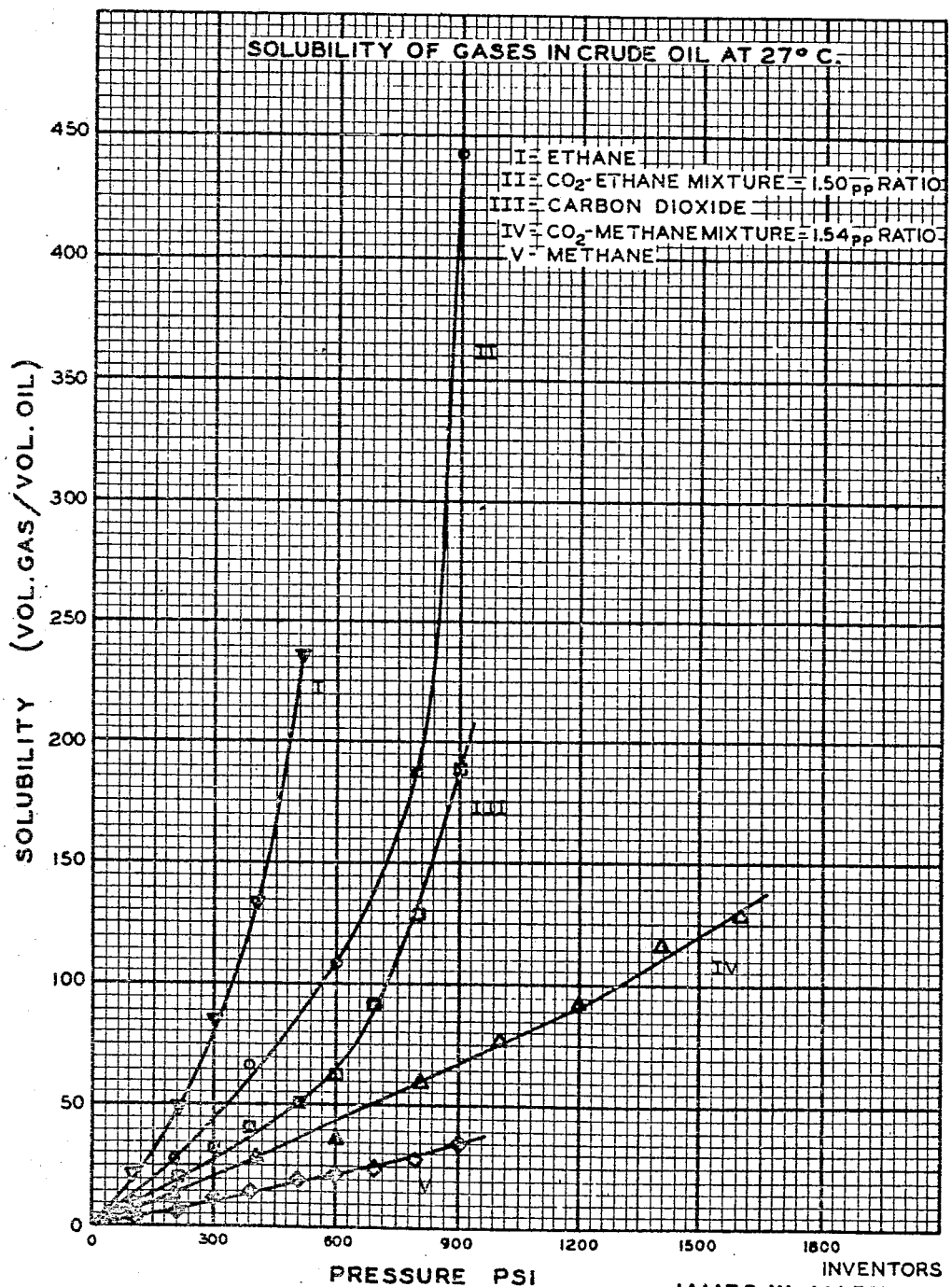

March 3, 1959

J. W. MARTIN ET AL 2,875,832

GASEOUS HYDROCARBON AND CARBON DIOXIDE
SOLUTIONS IN HYDROCARBONS

Filed Oct. 23, 1952

6 Sheets-Sheet 6

INVENTORS
JAMES W. MARTIN
FREDERICK A. HESSELL
IRVING P. HAMMER
JOHN B. RUST

BY Sol Shappirio

ATTORNEY

United States Patent Office 2,875,832
Patented Mar. 3, 1959

2,875,832
GASEOUS HYDROCARBON AND CARBON DIOXIDE SOLUTIONS IN HYDROCARBONS

James W. Martin, Tuckahoe, N. Y., and Frederick A. Hessel, Upper Montclair, Irving P. Hammer, Nutley, and John B. Rust, Verona, N. J., assignors to Oil Recovery Corporation, New York, N. Y., a corporation of New York Application October 23, 1952, Serial No. 316,492

2 Claims. (Cl. 166—9)

This invention relates to the recovery of oil or other hydrocarbon materials from subterranean hydrocarbon formations, to methods of effecting such recoveries, to materials and compositions useful in such methods, and to products recovered.

It has long been known that the recovery of oil or related hydrocarbons from subterranean strata or formations is quite inefficient from the standpoint of the oils or similar hydrocarbons which are left in the strata or formations. As a result many methods have been suggested for recovering such residual oil or hydrocarbons from the subterranean horizons. Such methods include procedures for driving out residual oil or hydrocarbons and various fluids have been proposed and utilized in such drive. Gaseous drives empoying air, nitrogen, natural gas or methane, etc., have been proposed and to some extent utilized.

Liquids, principally water, have been used in water flooding in efforts to drive out residual oil from the strata but such liquid or water drives have not been more successful than the gaseous drive in that they account for recoveries of the residual oil in the formation of not more than about the same amounts as those recovered by the gas drives. The fluids both gaseous and liquid have generally been utilized at relatively low pressures. While high pressures have sometimes been proposed, they have generally not been utilized in practice and such higher pressures with the stated drives do not appear to warrant such higher pressures since the recoveries with the stated drives are not materially higher to justify the use of the higher pressures. At best therefore even with the gas drives and water flooding operations some 30% more or less of the original oil or other hydrocarbons in the subterranean strata or formations remains therein and no methods have been devised in the prior art which are feasible commercially for obtaining greater recoveries.

In addition, in prior art recovery methods, gas release from the crude during production, exhibits deleterious effects such as increase in viscosity, surface tension, and specific gravity, as well as shrinkage. No simple satisfactory methods of preventing or control of such gas release has heretofore been possible.

Among the objects of the present invention is to improve methods of recovery of oil or other hydrocarbons from subterranean hydrocarbon formations.

Other objects include methods of control or regulation of gas release from oil or other subterranean hydrocarbons during recovery.

Further objects include methods for increasing the solubility of gaseous hydrocarbons in crude oil or related hydrocarbons.

Still further objects include compositions useful in carrying out such methods.

Still further objects include products obtained in operations as set forth above.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

Figure 2:
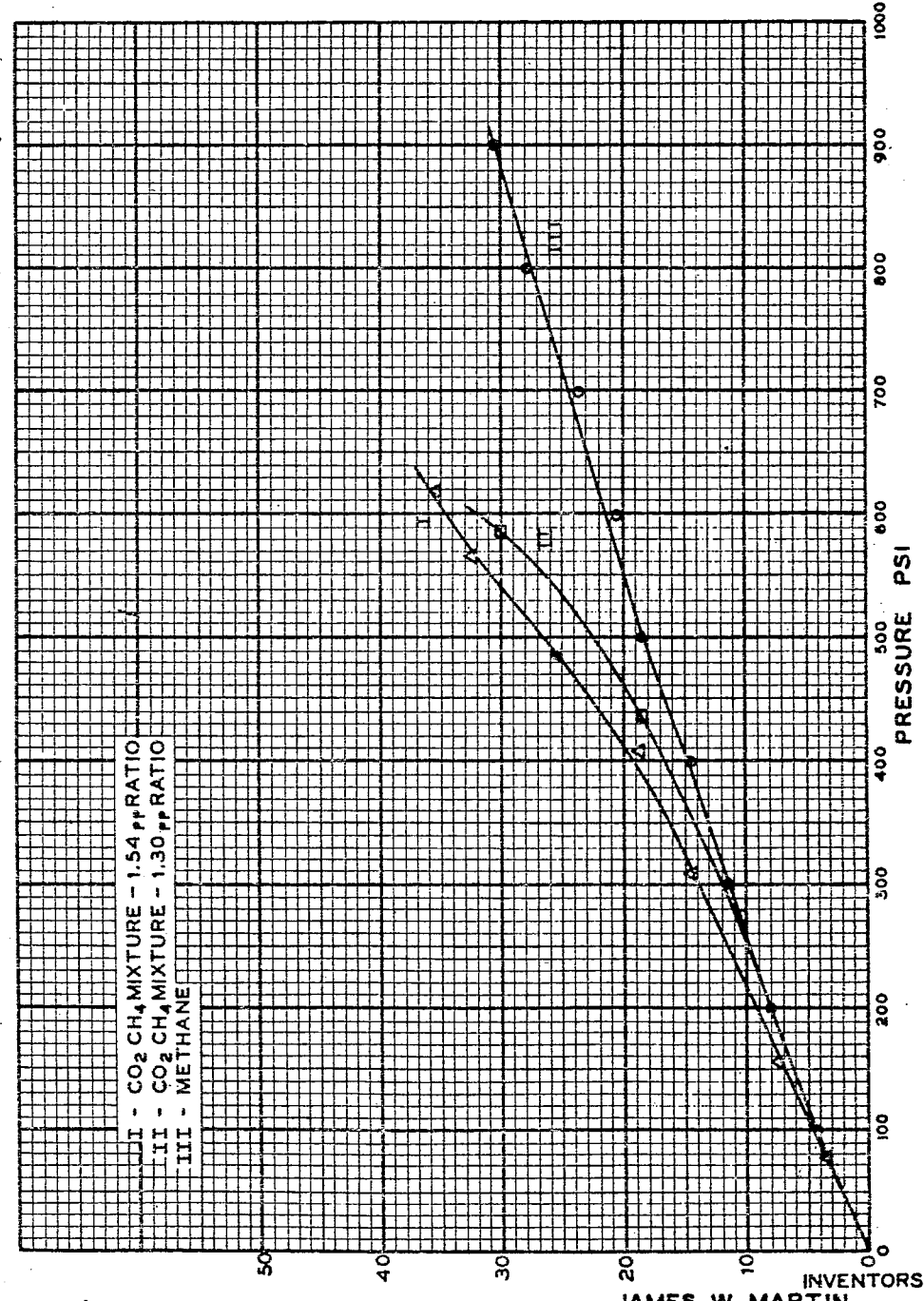
Figure 3:
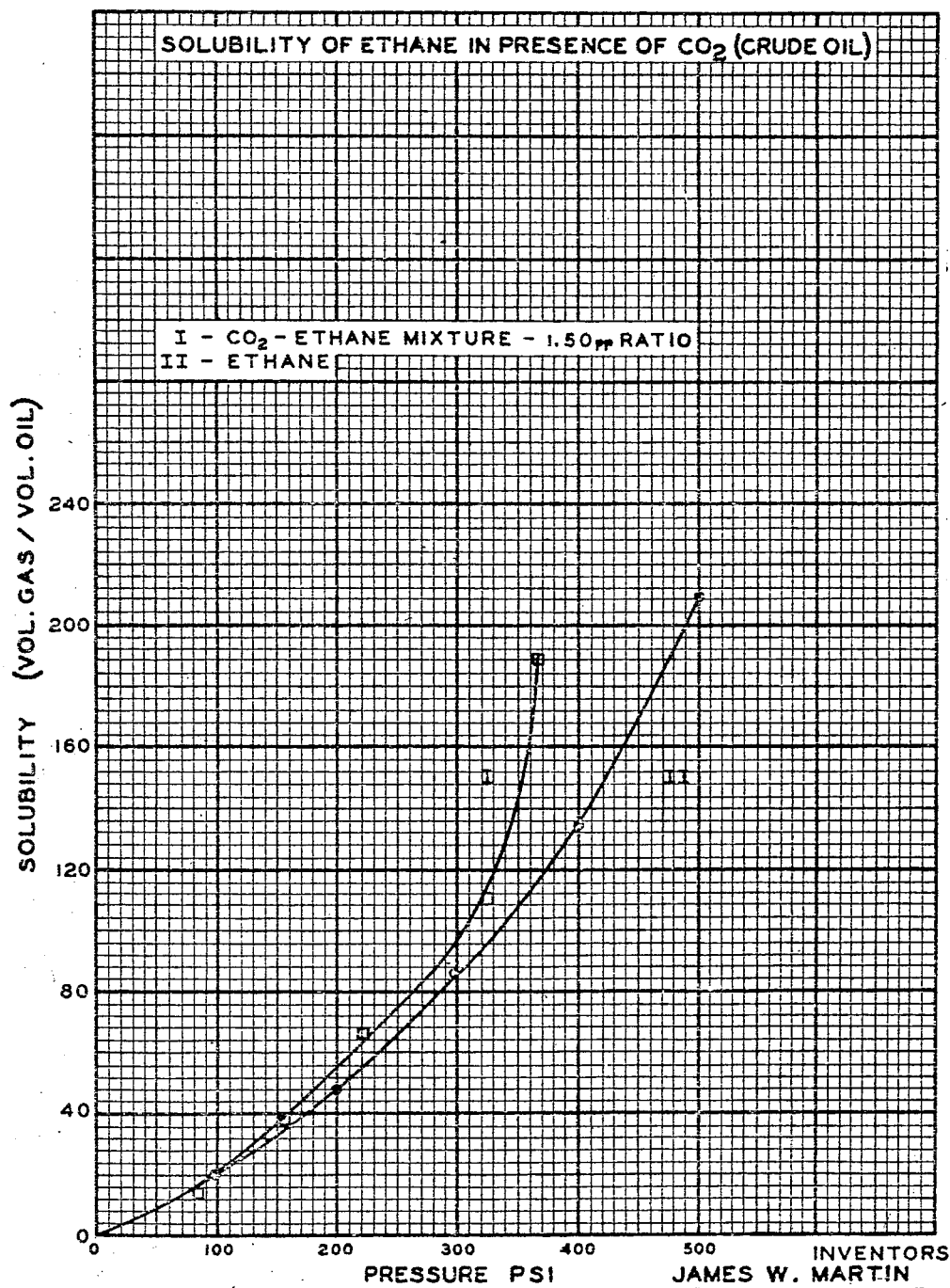
Figure 4:
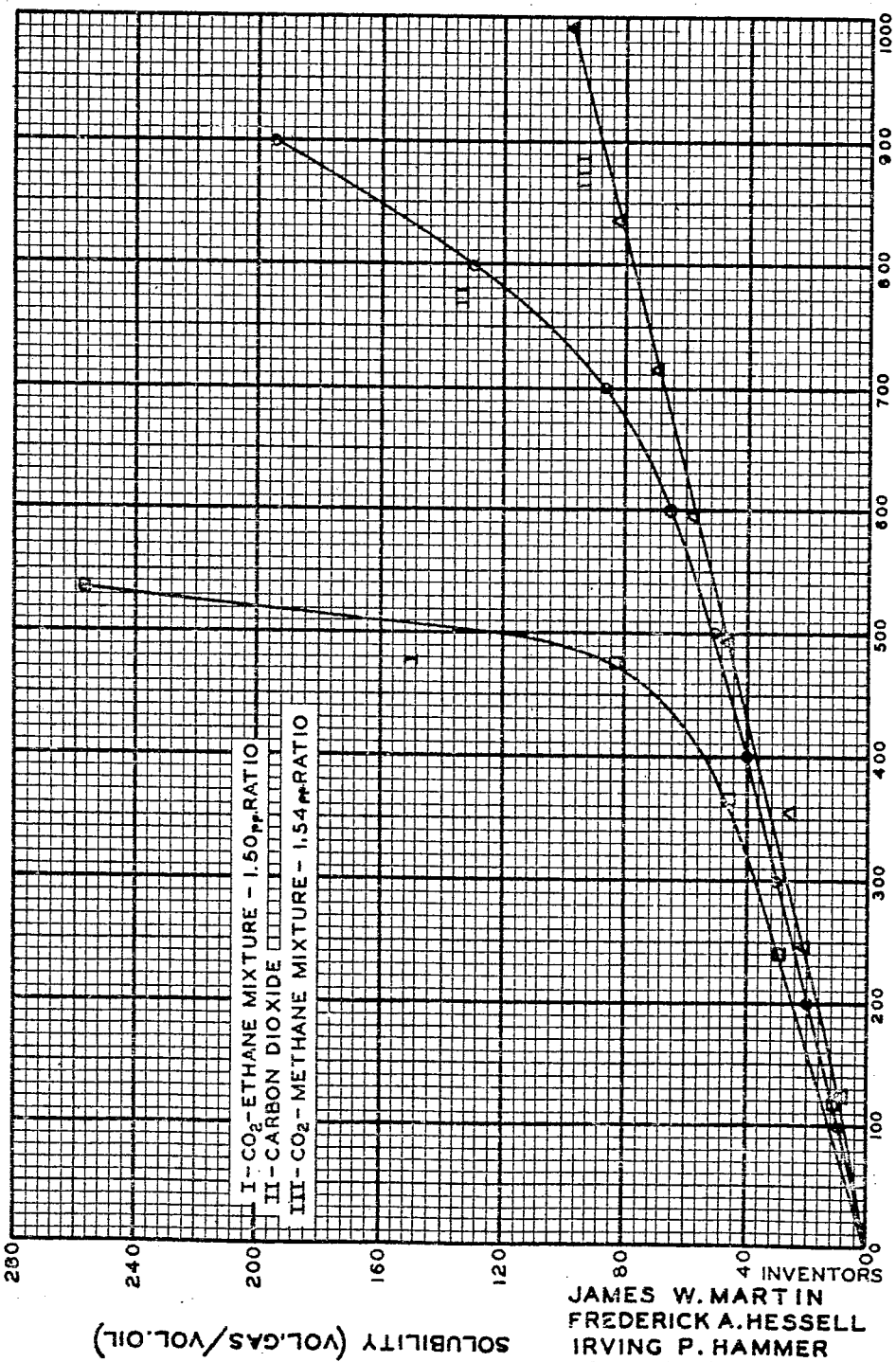
Figure 5:
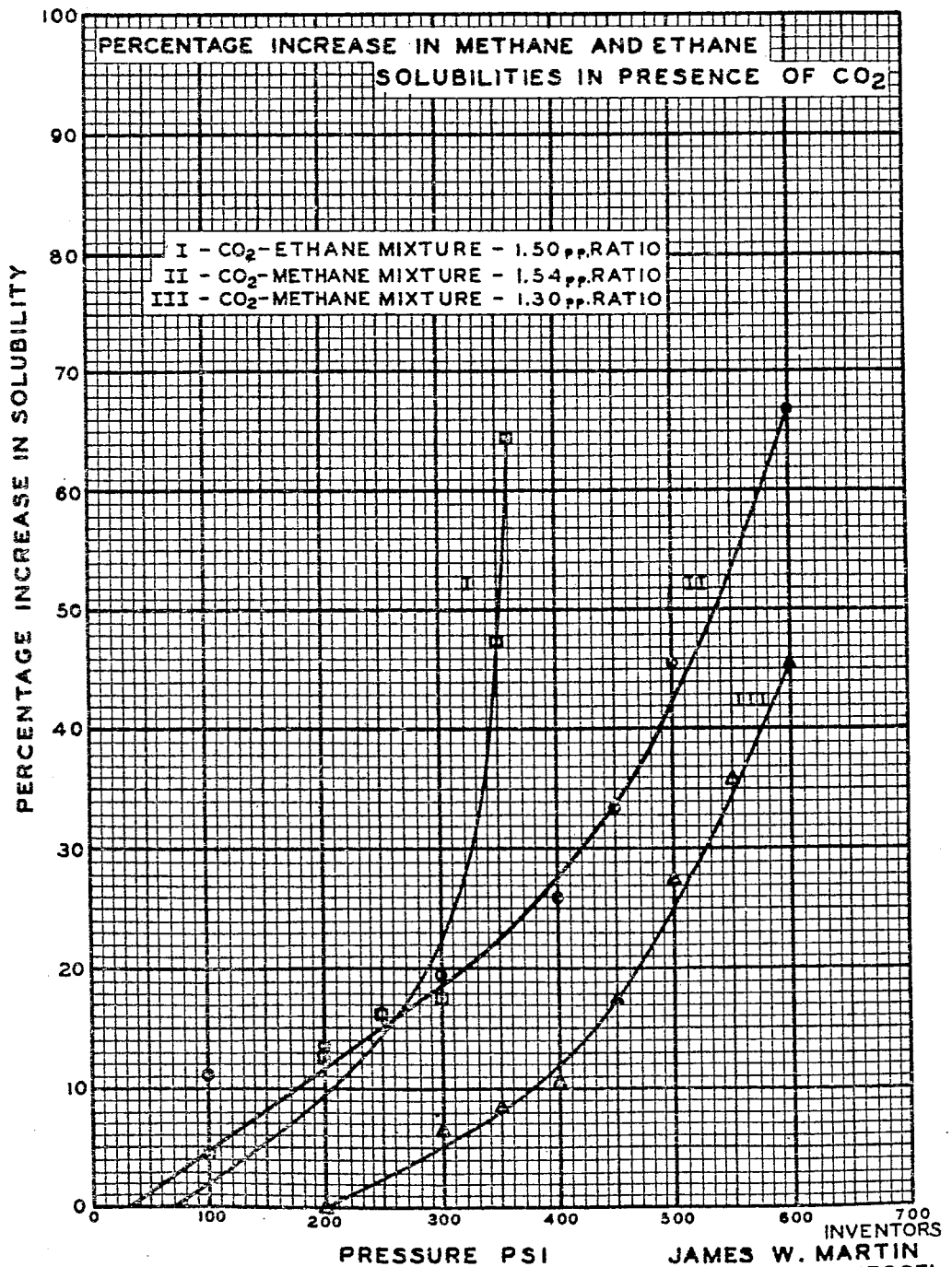
Figure 6:
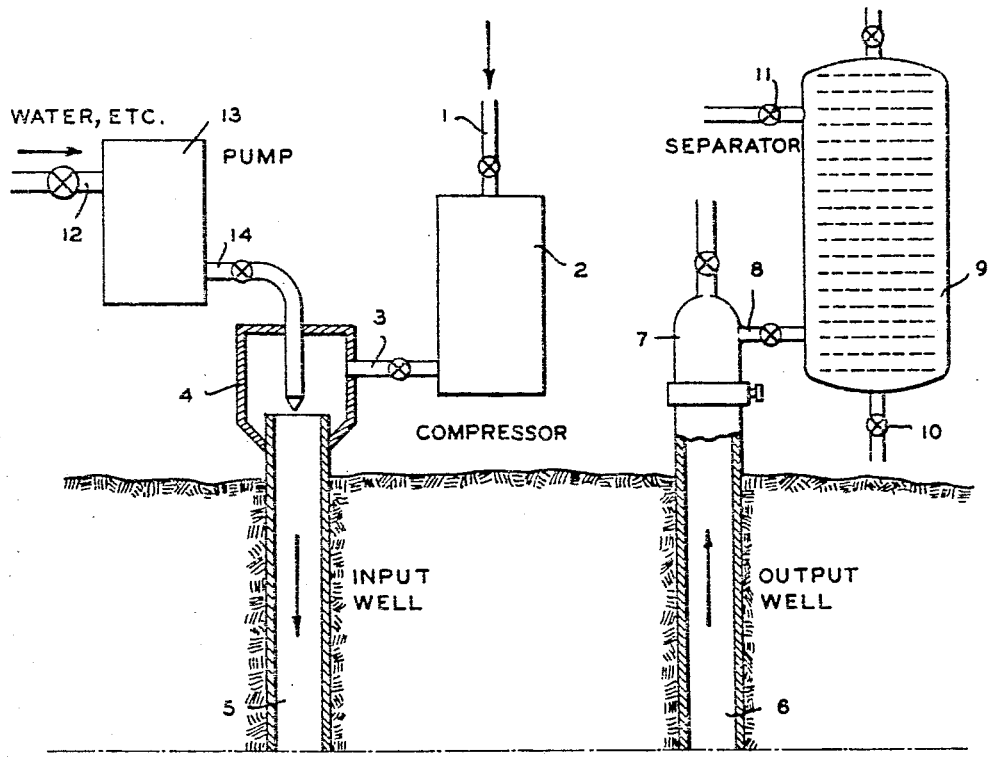
Figure 6:
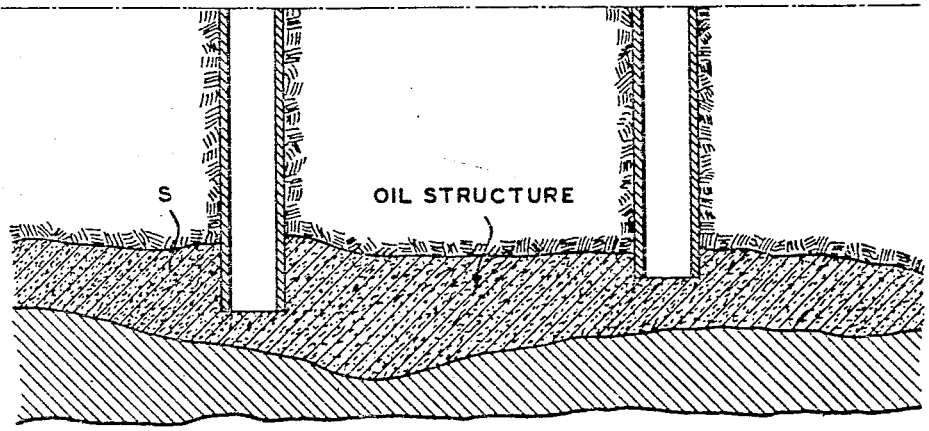

In connection with that more detailed description there is shown in the accompanying drawings, in Figure 1, curves showing solubility of certain gases in crude oil; in Figure 2, curves showing crude oil solubility of methane in the presence of carbon dioxide; in Figure 3, curves showing crude oil solubility of ethane in presence of carbon dioxide; in Figure 4, curves showing crude oil solubility of carbon dioxide in presence of methane and ethane; in Figure 5, curves showing percentage increase in crude oil solubilities of certain gases in the presence of carbon dioxide; and in Figure 6, a vertical section through a system utilizing the present invention in oil recovery.

In accordance with the present invention, it has been unexpectedly found that the solubility at elevated pressures of gaseous hydrocarbons in crude oil is very materially effected by carbon dioxide, that the effect in general is to increase very substantially the solubility of such lower paraffinic hydrocarbons in the crude oil, and that accordingly, the invention may very advantageously be utilized in the recovery of crude oil or related hydrocarbons from the earth.

The hydrocarbon gases generally include those hydrocarbons both saturated and unsaturated having up to and including four carbon atoms, among which may be mentioned particularly methane, ethane, propanes, butanes, ethylene, propylene, and acetylene; and also mixtures of these gases such as natural gas which is predominantly methane but includes ethane and in some instances, higher components as well as other mixtures such as those produced synthetically. The term "gas predominantly methane" or any analogous term when used herein covers such individually named gases as well as mixtures in which a named gas is the predominant, usually major, component.

A particularly valuable gas for use in the present invention is the gas obtained in treating subterranean hydrocarbon bearing formations with carbon dioxide under pressure of at least about 300 p. s. i. with more desirably of from about 600 p. s. i. up to 1400 p. s. i. and higher, there being no upper limit on the stated pressure other than convenience or economy. It has been found that the effluent from such processes contains carbon dioxide and hydrocarbons which are both gaseous and liquid under standard conditions of temperature (0° C.) and pressure (760 mm.) and after liquids are condensed from such effluent the residuum may desirably be recycled to be used as the gaseous medium for contacting hydrocarbon oils in situ in the earth or otherwise. Such gas residuum contains substantial amounts of normally gaseous hydrocarbons and some higher hydrocarbons also. Its character may depend on the conditions under which, and the locality where, it is produced. The quantity of methane in the gases may be greatly reduced from normal for such locality, and ethylene and propylene may be substantially absent. But substantial quantities of higher unsaturates (materials soluble in sulfuric acid) may be present which may run from 1 to 20% by weight, for example up to 7.5% of hydrocarbons in the range from butylene to pentylene. Under other conditions, substantial amounts of methane may be present.

Thus the effluent produced may be utilized as a source of gas to be employed in accordance with the present invention to produce solutions of relatively high content of dissolved gaseous hydrocarbons. The effluent residuum referred to above may be directly recycled to the in situ subterranean hydrocarbons if desired, or may be fortified by addition of carbon dioxide or any of the gaseous hydrocarbons saturated or unsaturated or both, before being recycled. In any event, this residuum will be used within the pressure ranges specified herein. Some representative examples of the hydrocarbon content of such gaseous residua are: (a) a product containing unsaturates constituting about 9.4% of the total hydrocarbons present, there being about 14.5% of total hydrocarbons in the form of hydrocarbons of at least four carbon atoms; and (b) unsaturates of about 4.5% of the total hydrocarbons present, with about 6.3% of the hydrocarbons present having at least four carbon atoms.

The liquid petroleum hydrocarbon fractions include both crude and refined petroleum oils and fractions thereof. They may be paraffinic base type oils, naphthenic base type oils, etc., and the fractions thereof. The invention will be sufficiently illustrated below by use of a Pennsylvania grade crude oil as represented by crude oil.

While it has been found that the normally gaseous hydrocarbons referred to above both, alone and in admixture, are substantially more soluble in liquid petroleum hydrocarbon fractions such as crude oil, the effect of the hydrocarbon gas on the solubility of the carbon dioxide in the liquid petroleum hydrocarbon fractions is not always the same. Thus, gases predominantly methane such as methane per se and natural gas, decrease the solubility of carbon dioxide in for example crude oil, while the hydrocarbon gases above methane generally increase the solubility of carbon dioxide in the crude oil for example. Thus methane and gases predominantly methane, therefore differentiate themselves in certain characteristics from gases of at least two carbon atoms, and are not equivalents in all respects.

Generally as to all of the gaseous hydrocarbons referred to herein, it may be said that in the presence of carbon dioxide under superatmospheric pressure, increased solubility of the hydrocarbon gas in the liquid hydrocarbon fraction is exhibited. However, the solubility is influenced materially by a number of factors, including the partial pressure of the gaseous hydrocarbon in contact with the liquid hydrocarbons and the ratio of the partial pressure of the carbon dioxide to that of the gaseous hydrocarbon present. These factors are very important in the present invention, and critical values will be evidenced where the order of increased solubility is substantial. For a given order of increased solubility, as the ratio of partial pressures of carbon dioxide to hydrocarbon gas increases, the lower is the partial pressure of the hydrocarbon gas which is needed to give a particular order of increased solubility. The solubility in general, is not a straight line relation however, and critical points or areas are evidenced in which the increase in solubility is very substantially evidenced as will appear from data given below. Here again methane deviates in its action as compared with the other hydrocarbon gases, since at lower partial pressure ratios of carbon dioxide to methane or gases predominantly methane, the partial pressure of methane to give substantially increased solubility may have to be very materially greater than for example is the case with ethane.

As a general rule, the carbon dioxide will be at least 50% by volume of the total gas in contact with the liquid hydrocarbons, so that the ratios of partial pressure of carbon dioxide to hydrocarbon gas will be at least 1:1. It may be as low as 0.1:1 but in such cases, the partial pressure of the hydrocarbon gas present will have to be very much greater as for example with methane of the order of 1400 to 1600 p. s. i. in order to get substantial increase in solubility over that obtained in the absence of carbon dioxide. The partial pressure ratio will generally not exceed about 2:1 and usually not above 1.5:1. Thus with methane, the pressure may generally be a partial pressure of methane of from about 50 to 1600 p. s. i. and a ratio of partial pressures of carbon dioxide to methane of from about 2:1 or 1.5:1 to 0.1:1. With ethane, pressures may be from about 50 to 500 p. s. i. partial pressure of ethane and ratios of partial pressures of carbon dioxide to ethane of from about 1.5:1 to 0.1:1; preferred pressures being from about 150 to 400 p. s. i. and partial pressure ratios of from about 1.5:1 to 1:1. For mixtures of the gaseous hydrocarbons, the pressure values will usually lie between those for the individual gases and depend on the predominant component; but here again there are critical values where the relation departs materially from a straight line function.

In producing the solutions any manner of contacting the material may be used. The oils or other liquid hydrocarbons may be contacted with the gases until the desired solution is obtained. Mixtures of carbon dioxide with the desired lower paraffinic hydrocarbons may be used to contact the oil to produce the solution; or, the gases may be successively contacted with the oil to produce the solutions. In the examples given below, when the combination of $CO_2$/methane was used, the oil was first saturated with carbon dioxide, followed by contact with methane. This procedure was desirably reversed when ethane was used since the maximum pressure of gaseous ethane at 70° F. amounts to only 528 p. s. i. The ethane-carbon dioxide examples referred to below were produced in this way. The actual procedure may vary depending on the particular gases, the type of crude oil, temperature, total pressures, partial pressures of the components of the gaseous mixtures, etc.

The resulting solutions may vary in character depending on the components and the conditions under which they are produced and maintained. These solutions may be used as a source of the oils or of the gaseous components thereof and may be shipped in pressure containers to points of utility.

Although an appreciable amount of data is available in the literature dealing with the solubility of natural gas, methane, and other gases in various crude oils or other hydrocarbon sytems, at elevated pressures, very little information is available concerning the similar solubility of carbon dioxide, ethane, or mixtures of carbon dioxide and gaseous hydrocarbons.

For utilization compartively herein, the solubility of carbon dioxide, methane and ethane in Pennsylvania grade crude oil at 27° C. was determined.

In these determinations, substantially the same procedure was followed in all instances. A given volume of crude oil was contacted intimately with the gas or gases for the desired determination, until saturation was reached, which usually required several hours. When the pressure remained constant, this was taken as indicating that maximum solubility of the gas in the oil had been reached. The gas dissolved in the oil was determined. Standard methods were used throughout.

The data for the stated gases is given below in Table I and plotted in Figure 1 of the drawings.

TABLE I

Solubility of gases in Pennsylvania grade crude oil A. P. I. gravity 42°

[Temperature 27° C.]

Solubility of gas (vols. gas/vol. oil)

| Pressure, p. s. i. | Carbon Dioxide | Methane | Ethane |
| --- | --- | --- | --- |
| 100 | 10.0 | 4.4 | 21.0 |
| 200 | 20.4 | 8.0 | 47.4 |
| 300 | 28.8 | 11.5 | 86.2 |
| 400 | 40.6 | 14.6 | 124.8 |
| 500 | 51.4 | 18.1 | 232 |
| 600 | 64.7 | 20.6 | |
| 700 | 87.3 | 23.4 | |
| 800 | 129.0 | 27.0 | |
| 900 | 194.2 | 30.5 | |

The following points may be noted in this connection. The solubility of methane is practically a straight line function over the pressure range examined. The carbon dioxide data are interesting in that while the solubility increases gradually over the range of 100 to 500 p. s. i. in a straight line fashion, a rather sharp increase in the slope of the solubility curve occurs at the 600-700 p. s. i. pressure point. Above this inflection point the solubility of carbon dioxide increases rapidly with increasing pressure. The solubility of ethane increases rapidly with increasing pressure with the result that at a pressure of 500 p. s. i. the solubility is as much as 232 volumes of ethane per volume of crude oil.

Work was carried out on mixtures of carbon dioxide and methane. The crude oil was contacted with gaseous mixtures given in the specific examples of Table II under the conditions set forth there. The data is given below in Table II and plotted in Figures 2 and 4 of the drawings.

TABLE II

*Solubility of gases in Pennsylvania grade crude oil A. P. I. gravity 42°*

[Temperature 27° C.]

| Total Pressure, p. s. i. | $CO_2$, p. p., p. s. i. | $CH_4$, p. p., | Ratio, $CO_{2pp}/CH_{4pp}$ | Total gas solubility | $CO_2$ solubility | $CH_4$ solubility |
|---|---|---|---|---|---|---|
| | | | | (Vol. gas/vol. oil) | | |
| 200 | 122 | 78 | 1.56 | 13.5 | 9.8 | 3.7 |
| 400 | 244 | 156 | 1.56 | 28.1 | 20.7 | 7.4 |
| 600 | 355 | 245 | 1.45 | 37.4 | 27.3 | 10.1 |
| 800 | 492 | 308 | 1.60 | 60.8 | 46.2 | 14.6 |
| 1,000 | 592 | 408 | 1.45 | 77.9 | 59.2 | 18.7 |
| 1,200 | 712 | 488 | 1.46 | 93.5 | 68.3 | 25.2 |
| 1,400 | 837 | 563 | 1.49 | 116.1 | 83.6 | 32.5 |
| 1,600 | 990 | 610 | 1.62 | 133.0 | 97.4 | 35.6 |

It was noted that solubility of methane in crude oil in the presence of carbon dioxide is related to the equilibrium ratio of the partial pressures of the two gases. In general, the greater the $CO_2:CH_4$ partial pressure ratio, the greater the increase in the methane solubility at a given pressure. Thus, in the data given in Table II the $CO_2:CH_4$ partial pressure ratios at the equilibrium final pressure was maintained between the limits of 1.54±0.08. However, for comparison purposes there is also included in Figure 2 the curve obtained when the $CO_2:CH_4$ partial pressure ratios were kept within the limits of 1.30±0.08. It can be seen that the presence of larger amounts of $CO_2$ in the equilibrium gas mixture consistently increases the solubility of the methane at a given pressure. It is to be noted that at the $CO_2:CH_4$ ratios of either 1.54 or 1.30 the methane solubility curve shows a pronounced change of slope at a partial pressure of about 400 p. s. i. and 450 p. s. i. respectively in contrast to the solubility curve for methane along which no distinct increase in slope occurs over the pressure range studied. This change of slope is probably related to the fact that at 400 p. s. i. $CH_4$ partial pressure and a $CO_2:CH_4$ ratio of 1.54, the partial pressure of the carbon dioxide present is slightly above 600 p. s. i., which is the pressure area wherein the normal carbon dioxide solubility curve also begins to show a sharp increase in slope.

With regard to the effect of the presence of methane on the solubility of carbon dioxide, it can be seen by examining Fig. 4, that the resulting solubility curve is practically linear in nature. There is no longer a sudden change in slope at the 600 p. s. i. pressure point and the net result appears to be a marked reduction in the carbon dioxide solubility particularly in the pressure range of 600-1000 p. s. i.

The production of solutions of ethane and carbon dioxide was carried out by contacting the crude oil with gaseous mixtures in examples tabulated in Table III below, and plotted in Figures 3 and 4 of the drawings.

TABLE III

*Solubility of gases in Pennsylvania grade crude oil A. P. I. gravity 42°*

[Temperature 27° C.]

| Total Pressure, p. s. i. | $CO_2$, p. p., p. s. i. | $C_2H_6$, p. p., | Ratio, $CO_{2pp}/C_2H_{6pp}$ | Total gas solubility | $CO_2$ solubility | $C_2H_6$ solubility |
|---|---|---|---|---|---|---|
| | | | | (Vol. gas/vol. oil) | | |
| 200 | 119 | 81 | 1.47 | 27.0 | 11.7 | 15.3 |
| 400 | 242 | 158 | 1.53 | 66.5 | 28.9 | 37.6 |
| 600 | 364 | 236 | 1.54 | 109.1 | 44.2 | 64.0 |
| 800 | 475 | 325 | 1.46 | 193.2 | 83.1 | 110.1 |
| 900 | 537 | 363 | 1.48 | 443.5 | 256.0 | 187.5 |

These data are particularly interesting in that not only does the presence of carbon dioxide increase the solubility of ethane in oil at a given pressure but, at the same time, the presence of ethane increases the solubility of the carbon dioxide. These examples were carried out at a $CO_2:C_2H_6$ partial pressure ratio of 1.50±0.04. At this ratio, an examination of Figures 3 and 4 shows that a very rapid increase in solubility occurs in both the carbon dioxide and ethane curves at partial pressures of about 450 and 325 p. s. i. respectively.

On the basis of the data obtained it is apparent that the presence of carbon dioxide has a marked effect in increasing the solubility of gaseous hydrocarbons in crude oil. In view of the data obtained with both methane and ethane it appears that the greater the molecular weight of the hydrocarbon involved, the more marked is the increase in solubility brought about by the presence of carbon dioxide.

Since natural gas consists mainly of methane with varying quantities of ethane and higher hydrocarbons, it can be expected that the increase in solubility of natural gas in the presence of $CO_2$ will be somewhere between that of methane and of ethane. Solutions of natural gas and carbon dioxide in crude oil were produced. A synthetic natural gas consisting of 80% methane and 20% ethane was used with Monder crude oil to illustrate this phase of the invention.

At a $CO_2$:synthetic natural gas ratio of 1.30 and a natural gas partial pressure of 540 p. s. i. the increase in natural gas solubility as compared to the increase in solubility of $CH_4$ under the same conditions were as follows:

| Gas Mixture | Solubility in Pennsylvania Grade Crude Oil (Vols. of hydrocarbon gas/vol. of oil) | Percent increase in solubility over that of pure $CH_4$ |
|---|---|---|
| $CH_4$ | 19.5 | |
| $CO_2:CH_4$ | 26.0 | 33.3 |
| $CO_2$:Natural Gas (80% $CH_4$, 20% $C_2H_6$) | 35 | 80.0 |

It is significant that while the partial pressure of the ethane in the natural gas mixture at 540 p. s. i. is only slightly more than 100 p. s. i., the percentage increase in solubility of the total gaseous hydrocarbon mixture was more than double that of methane from a carbon dioxide-methane mixture (1.30 $CO_2:CH_4$ ratio).

With respect to the actual percentage increase in solubility of methane in the presence of $CO_2$ over that of pure methane, reference to Fig. 5 of the drawing shows that to attain the same 30% increase in solubility, the partial pressure of the $CH_4$ in a $CO_2$—$CH_4$ mixture of a 1.5 $CO_2:CH_4$ p. p. ratio need only be 420 p. s. i. as compared to 530 p. s. i. $CH_4$ when the gas mixture has a 1.3 $CO_2:CH_4$ p. p. ratio. Furthermore, when the ratio is 1.3 $CO_2:CH_4$ no particular increase in methane solubility occurs until the methane partial pressure is above 200 p. s. i. Should the $CO_2:CH_4$ ratio be reduced further, both the total pressure of the gas mixture and the methane partial pressure would have to be higher before the increase in methane solubility would become apparent.

The invention has particular utility in the field of oil recovery by utilization of carbon dioxide to increase the solubility of gaseous hydrocarbons in crude oil. Since it is generally true that formation volume factors of oils increase linearly with the volumes of gas dissolved, it is interesting to note the total gas solubility in Pennsylvania grade crude oil of the carbon dioxide-gaseous hydrocarbon mixtures under investigation (Fig. 2). It can be seen that at a pressure of 900 p. s. i. the solubility of methane in the crude is only 30 volumes per volume of oil while a $CO_2$—$CH_4$ mixture at a partial pressure ratio of 1.5 more than doubles the total gas solubility, 4 g., 70 vols. gas/vol. oil. The total solubility of a carbon dioxide-ethane mixture at approximately the same partial pressure ratio approaches the exceedingly high value of 440 vols. gas/vol. oil. Thus, in primary recovery, carbon dioxide or mixtures of carbon dioxide and gaseous hydrocarbons, particularly lower gaseous hydrocarbons may be introduced into the formation to control or prevent or regulate gas release from the crude in the ground, due to increase in total gas solubility brought about by the presence of carbon dioxide. Ill effects of gas release from the crude during production, such as increase in viscosity, surface tension, and specific gravity, as well as shrinkage, may thus be counteracted. The desired gases may be introduced directly into the formation for this purpose. Where the formation contains the necessary lower paraffinic hydrocarbon, only carbon dioxide need be introduced. Where necessary, a carbon dioxide and lower paraffinic hydrocarbon may be introduced either as a mixture or successively. The pressures of the gases both total and partial may be as indicated above in the examples there given.

As exemplary of a system that may be used in this way reference may be made to Figure 6 of the drawings which is a diagrammatic representation for recovery of oil utilizing an input well into which the gases are introduced and passed into the strata. As there shown, the gaseous mixture of fluid composition entering from any desired source through inlet pipe 1 passes through compressor 2 if desired, where the pressure may be raised to the order of pressures set forth above for use, and then passes through pipe 3 by way of head 4 into the input well 5 from which the fluid under the desired pressure enters the subterranean oil strata or formation S. The effluent enters outlet well 6 and is removed through head 7 and valved pipe 8 into separator 9 where if desired separation may be made between liquids and gases, liquids being withdrawn through valved outlet 10 and gases removed at valved outlet 11. Such gases may be used for recovery of constituents therefrom and the residues recycled, or the entire gaseous product without separation may be recycled. When recycled, the gases may be fortified by addition of the necessary added components to reconstitute the fluid to be introduced into the formation. Where a water or other drive is used in the process of treating the subterranean strata, water or other medium may be introduced through valved line 12 to pump 13, and then led by line 14 into the input well 5.

Liquids separated as above may be shipped to refineries or otherwise treated. Or the solution of carbon dioxide and lower aliphatic hydrocarbons in the crude oil, may be collected in containers under the necessary pressure and sent to storage or to refineries, or used as a source of the contained gases or oils.

Having thus set forth our invention, we claim:

1. In a method of recovering liquid hydrocarbons from a subterranean oil formation, the steps of injecting into such formation carbon dioxide and a gas, predominantly hydrocarbon of from 2 to 4 carbon atoms, the partial pressure of the gas, predominantly hydrocarbon, being within the range from about 150 to about 500 p. s. i., the ratio of partial pressure of carbon dioxide to gas, predominantly hydrocarbon, being in the range from about 2:1 to about 1:1, contacting said liquid hydrocarbons with said gases at a temperature of the order of 27 degrees C., and withdrawing from said formation an effluent comprising liquid hydrocarbons and said gases.

2. In a method of recovering liquid hydrocarbons from a subterranean oil formation, the steps of injecting into such formation carbon dioxide at a total pressure of at least about 300 p. s. i. to form an effluent containing carbon dioxide and hydrocarbons which are gases and liquids at standard conditions of temperature and pressure, condensing liquid hydrocarbons from said effluent, recycling the residual effluent including carbon dioxide and hydrocarbons containing predominantly 2 to 4 carbon atom hydrocarbons in substantial amount into an oil formation, contacting liquid hydrocarbons therein at a temperature of the order of 27 degrees C. with said recycled residual effluent, the partial pressure of the 2 to 4 carbon atom hydrocarbons in the recycled gas being within the range from about 300 to 500 p. s. i. and the ratio of partial pressure of carbon dioxide to 2 to 4 carbon atom hydrocarbons being from 2:1 to 0.1:1, and withdrawing from this formation an effluent, comprising liquid hydrocarbons and said gases.

References Cited in the file of this patent

UNITED STATES PATENTS

| | | |
|---|---|---|
| 1,249,232 | Squires | Dec. 4, 1917 |
| 1,826,371 | Spindler | Oct. 6, 1931 |
| 2,166,160 | King | July 18, 1939 |
| 2,188,013 | Pilat et al. | Jan. 23, 1940 |
| 2,623,596 | Whorton et al. | Dec. 30, 1952 |

OTHER REFERENCES

Petroleum Development & Technology in 1926, Petroleum Div., A. I. M. E. pp. 51–63.

Increasing the Recovery of Petroleum, Osgood, vol. I, (c) 1930, page 113.